(12) United States Patent
Monga et al.

(10) Patent No.: US 7,580,149 B2
(45) Date of Patent: Aug. 25, 2009

(54) METHOD AND SYSTEM FOR IDENTIFICATION OF REPEAT PRINT JOBS USING OBJECT LEVEL HASH TABLES

(75) Inventors: Vishal Monga, Torrance, CA (US); Gaurav Sharma, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/868,173

(22) Filed: Oct. 5, 2007

(65) Prior Publication Data

US 2009/0094198 A1    Apr. 9, 2009

(51) Int. Cl.
*G06F 15/00* (2006.01)
*G06F 15/16* (2006.01)
(52) U.S. Cl. ...................... 358/1.16; 709/219
(58) Field of Classification Search ........... 358/1.15, 358/1.1, 1.16, 1.13, 1.14, 1.18; 709/201, 709/203, 219, 225, 232, 238; 707/3, 4, 10, 707/201; 455/217, 432.1, 556.1
See application file for complete search history.

(56) References Cited

U.S. PATENT DOCUMENTS

| | | | |
|---|---|---|---|
| 6,618,167 B1 | 9/2003 | Shah | 358/1.15 |
| 6,671,407 B1 | 12/2003 | Venkatesan et al. | 382/232 |
| 6,751,425 B2 | 6/2004 | Fujimori et al. | 399/69 |
| 6,819,445 B1 | 11/2004 | Stevenson et al. | 358/1.15 |
| 6,928,564 B2 | 8/2005 | Tada et al. | 713/321 |
| 7,069,327 B1 | 6/2006 | Fabre | 709/227 |
| 2004/0190057 A1 | 9/2004 | Takahashi et al. | 358/1.15 |
| 2004/0246512 A1 | 12/2004 | Miyamoto | 358/1.13 |
| 2005/0030574 A1 | 2/2005 | McVey et al. | 358/1.14 |
| 2005/0219610 A1* | 10/2005 | Kimura et al. | 358/1.15 |
| 2006/0050294 A1 | 3/2006 | Smith et al. | 358/1.15 |
| 2007/0044101 A1 | 2/2007 | Suzuki et al. | 718/102 |
| 2007/0047993 A1 | 3/2007 | Brinsley | 399/75 |
| 2008/0037034 A1* | 2/2008 | Ishii | 358/1.1 |

* cited by examiner

*Primary Examiner*—Saeid Ebrahimi Dehkordy
(74) *Attorney, Agent, or Firm*—Kermit D. Lopez; Luis M. Ortiz; Tuesday A. Kaasch

(57) ABSTRACT

A method and system for identifying print jobs that are repeats of a previously completed job utilizing an object level hash table. Received print jobs can be parsed into meaningful classes of objects and a table of hash values can be computed for objects in each class and for each print job. A synopsis comprising the table of hash values can be retained in a database along with the job specific settings. A newly encountered job can be then declared as a repeat of a previous job based on the hashes for the new job that match the hash values for the previous job stored in the database. The classes of objects are readily determinable in common document formats used for print job submission, such as PDF.

14 Claims, 5 Drawing Sheets

METHOD AND SYSTEM FOR IDENTIFICATION OF REPEAT PRINT JOBS USING OBJECT LEVEL HASH TABLES

TECHNICAL FIELD

Embodiments are generally related to data processing methods and systems. Embodiments are also related to print job management in production printing environments. Embodiments are additionally related to methods and systems for identifying repeat print jobs utilizing object level hash tables.

BACKGROUND OF THE INVENTION

Color jobs in production printing environments often require job specific settings in order to obtain a satisfactory rendition. When a job is repeated, it is highly desirable that the same settings be replicated so that the customer sees consistency from job to job. Color control settings required for a job are a common example of such job specific settings. Repeat jobs are commonly seen in production printing environments because print job submissions have a significant number of color critical elements in common with a previously completed print job. These repeat jobs can span the gamut from explicit requests for additional re-prints, identical re-submissions of the same job, and the submission of a fresh job that incorporates minor modifications over a previous submission, or even a new job that shares some crucial elements with a previous job. An example could be a logo image used for corporate identity that is contained in several jobs.

For instance, a customer ordering calendars utilizing a different personalized image for each of the months can request different versions of the calendar where a few of the images can be changed from version to version. Finally, a customer can also re-submit a complete job for which they have already received prints from a previous order without explicitly indicating a connection with the previous order. It is highly desirable that consistency is maintained across such repeat jobs in job-specific settings, such as those relating to color rendition.

One prior art approach utilizes a test pattern, which is printed with the original job and then reprinted with the reprint job. The measurements from these test patterns are then utilized to derive a transformation that ensures a consistent reproduction of the reprint job. The identification of a job as a reprint job is assumed to be accomplished by other means such as a repeat order of an archived job at the print shop. In all of these scenarios, it is desirable that the repeat job be automatically identified as such so that care may be taken to ensure that the prints for the new submission are consistent with those from the original order.

A print server can be utilized for storing print jobs printed by a printer. This print server enables each print job stored therein to be reprinted by the printer, in response to a user's particular reprinting request. The print server utilized for such prior art applications requires a high-capacity storage device for storing print jobs of high-volume image data, such as, for example, photographic images. In such cases, the number of print jobs stored in the print server may be restricted. A technique used for identification of repeat jobs must provide for a meaningful way to compare jobs in scenarios when they share significant number of critical elements, e.g. color, images, graphics etc, but are not necessarily identical. Additionally, the scheme should be efficient in the sense of memory and computation to facilitate scalability for large databases. Hash functions as described next, present an apposite solution.

A hash function may be described as a map from a "large" to a "small" set. In practice, a hash function is designed to map arbitrary digital inputs to a fixed length output binary string. The key idea behind hashing is that not all possible versions of the digital inputs can be encountered in practice and therefore the hash function can be designed such that, with high probability, the fixed length output binary strings are distinct for distinct inputs. Hash functions are widely used in compilers, databases, and cryptography.

In order to appreciate the use of hash functions, it is helpful to refer to a general mathematical model. For example, the variable X can be utilized to denote a set of inputs, and for any x in X, the function h(x) can represent an output binary hash value. For an n-bit hash value with a binary string of length n, the output binary hash value can be expressed in the form of equation (1) as follows:

$$h(x) \in \{0,1\}^n \; \forall \; x \in X \qquad (1)$$

where $2^n < |X|$

In equation (1) above, |X| represents the number of elements in the set of inputs X. Note that the number of hash realizations is much lesser than the cardinality of the set of inputs X. A target application hence guides the construction of hash functions and their properties.

In particular, let X represent the set of all character strings with a maximum length. Let h(x) be defined as shown in equation (2)

$$h(x) = f(x) \bmod M, \forall \; x \in X \qquad (2)$$

f(x)—sum of ASCII codes corresponding to each character in the string x

M—a prime number

The hash can be simply computed as the remainder obtained upon division of a positive integer (sum of ASCII codes) by a prime number. Hence, in this case valid hash values are 0, 1, 2 . . . , M−1.

FIG. 1 illustrates a prior art representation 100 of a hash function in querying employee records. Consider the example depicted in FIG. 1, where a hash value is utilized to search employee records in a database by using the employees' names as query data. In FIG. 1, a group of keys 10, indexes 20 and key-value pairs 30 are depicted. The keys 10 are associated with name values 12, 14, 16, and the indexes 20 include indexes 18, 21, 22. Index 18 includes index values 24, 26 and index 21 includes index values 28 and 31. Similarly, index 22 includes index values 32 and 34. The key-value pairs 36 (e.g., records) include records 36, 38, and 40.

Thus, a table of hash values or indexes 20 can be maintained where the indexes 20 can be utilized to fetch the employee information using keys 10 and key value pairs 30 can be recorded. When a new "employee name" is queried, the hash function from the same is computed and used as an indexes 20. Given n-bit hashes, and appropriate data structures to store them, binary search can facilitate search that is O (log n) in most cases.

The cardinality of X is much larger than $2^n$, and the size of each x in X is large enough so that comparing x, x' may be prohibitively slow. The two properties that such a hash function is desired to satisfy are uniform distribution and collision resistance. The hash function "uniformly" distributes the data across the entire set of possible hash values as illustrated, for example, by equation (3) below:

$$Pr(h(x) = v) \approx \frac{1}{2^n}, \forall v \in \{0, 1\}^n \quad (3)$$

The probability space as shown in equation (3) is given by all possible realizations of the hash function over the set X. The collision resistance should be difficult ideally computationally infeasible to find/generate distinct inputs x, x' such that h(x)=h(x'). In addition to the aforementioned mathematical requirements that are crucial for scalability across large data sets, the most significant practical requirement is for the hash computation to be extremely fast. The aforementioned example illustrates the virtues of hashing in retrieving large digital objects. Print jobs may be viewed as composed of a multitude of digital objects and hence a scheme based on object-level hashes can present a viable solution to enable their search and retrieval.

Based on the foregoing it is believed that a need exists for an improved method and system that achieves consistency across repeat jobs without requiring archival of the complete jobs available in order to ensure highly reliable identification of repeat jobs. Additionally, a need exists for providing a methodology that enables a time and memory efficient solution to the problem of identifying repeat print jobs utilizing object level hash tables.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved data processing method and system.

It is another aspect of the present invention to provide for improved print job management system.

It is a further aspect of the present invention to provide for an improved method and system for automatically identifying repeat print jobs utilizing object level hash tables.

The aforementioned aspects and other objectives and advantages can now be achieved as described herein. Methods and systems are disclosed for automatically identifying print jobs that are repeats of a previously completed job utilizing an object level hash table. Received print jobs can be parsed into meaningful classes of objects and a table of hash values can be computed for objects in each class and for each print job. A synopsis comprising the hash tables can be retained in a database along with the job specific settings. A newly encountered job can be then declared as a repeat of a previous job based on the hashes for the new job that match the hash values for the previous job stored in the database. The classes of objects are readily determinable in common document formats utilized for print job submission, such as, for example, a PDF (Portable Document Format).

The identification of repeat print jobs can benefit determining the right color settings for the new job by retrieving the corresponding settings for the previously completed job. Additionally, other job specific settings, for example font-substitution preferences, trapping, etc may also be archived and used later. The method disclosed herein can be detected in a system by examining the steps involved in the processing of the new job and the job logs/database. A pointer to the location of the job can additionally be kept in the database record if there is a need to retain the previously processed jobs.

The synopsis, its constituent hash tables, and the measure to match hash tables can all be adapted to suit customer and print job requirements. For example, hashes corresponding to text objects can be included if a specialized font rendering is required. For other applications, which are, focused on image and graphics colors, hashes from text objects may not be included. The identification of repeat print jobs can preferably be utilized to determine synthetically created jobs and to ensure consistent reproduction for repeat jobs in a print shop environment where the repeat jobs may differ in non critical respects. The classes of objects can include for example images, pantone colors, line art, text paragraphs, etc.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments described herein can be implemented in the context of a host operating system and one or more modules. Such modules may constitute hardware modules, such as, for example, electronic components of a computer system. Such modules may also constitute software modules. In the computer programming arts, a software "module" can be typically implemented as a collection of routines and data structures that performs particular tasks or implements a particular abstract data type.

Software modules generally can include instruction media storable within a memory location of an image processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term "module" as utilized herein can therefore generally refer to software modules or implementations thereof. Such modules can be utilized separately or together to form a program product that can be implemented through signal-bearing media, including transmission media and/or recordable media. An example of such a module is module 111 depicted in FIG. 2.

It is important to note that, although the embodiments are described in the context of a fully functional data-processing system (e.g., a computer system), those skilled in the art will appreciate that the mechanisms of the embodiments are capable of being distributed as a program product in a variety of forms, and that the present invention applies equally regardless of the particular type of signal-bearing media utilized to actually carry out the distribution. Examples of signal bearing media include, but are not limited to, recordable-type media such as media storage or CD ROMs and transmission-type media such as analogue or digital communications links. The logical operation steps depicted in FIGS. 5-6 can, for example, be implemented in the context of such a software module.

Figure 1:
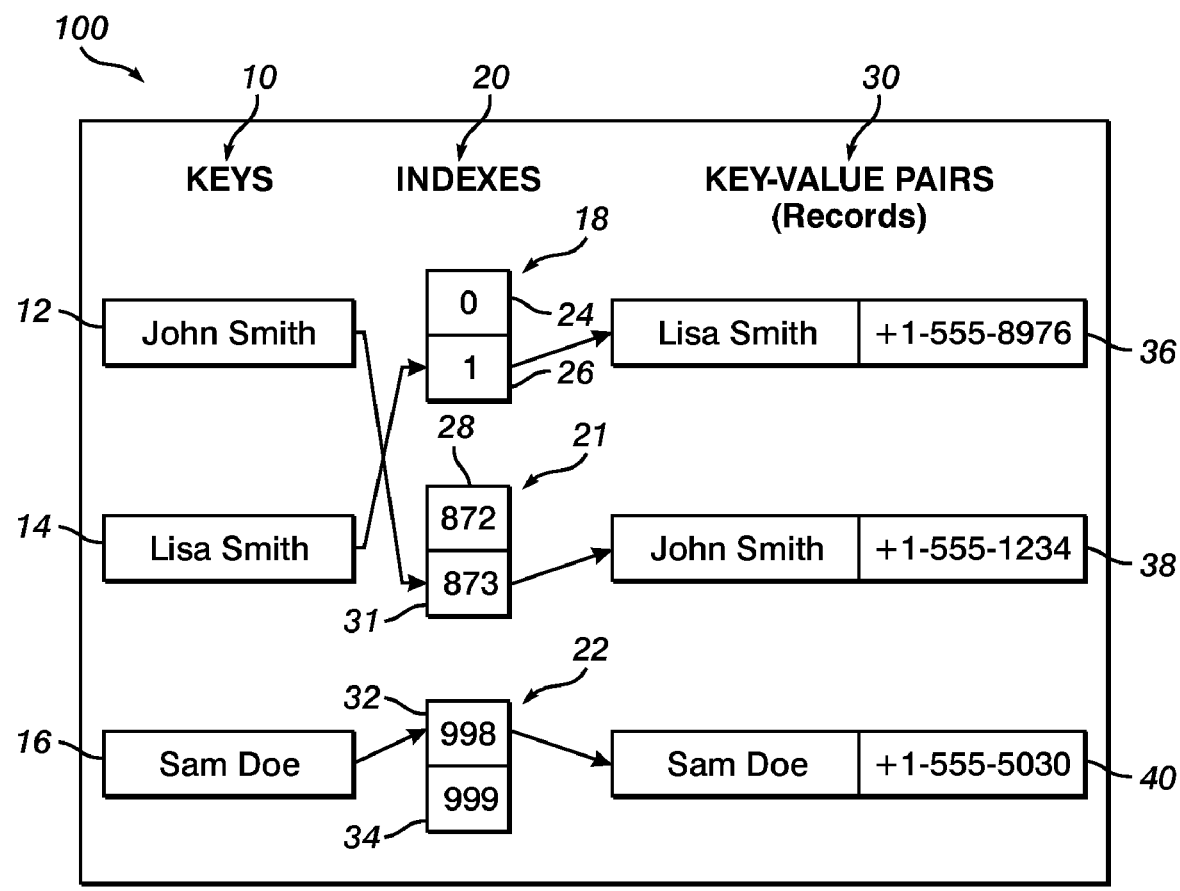
FIG. 1 illustrates a prior art representation of a hash function in querying employee records.
Figure 2:
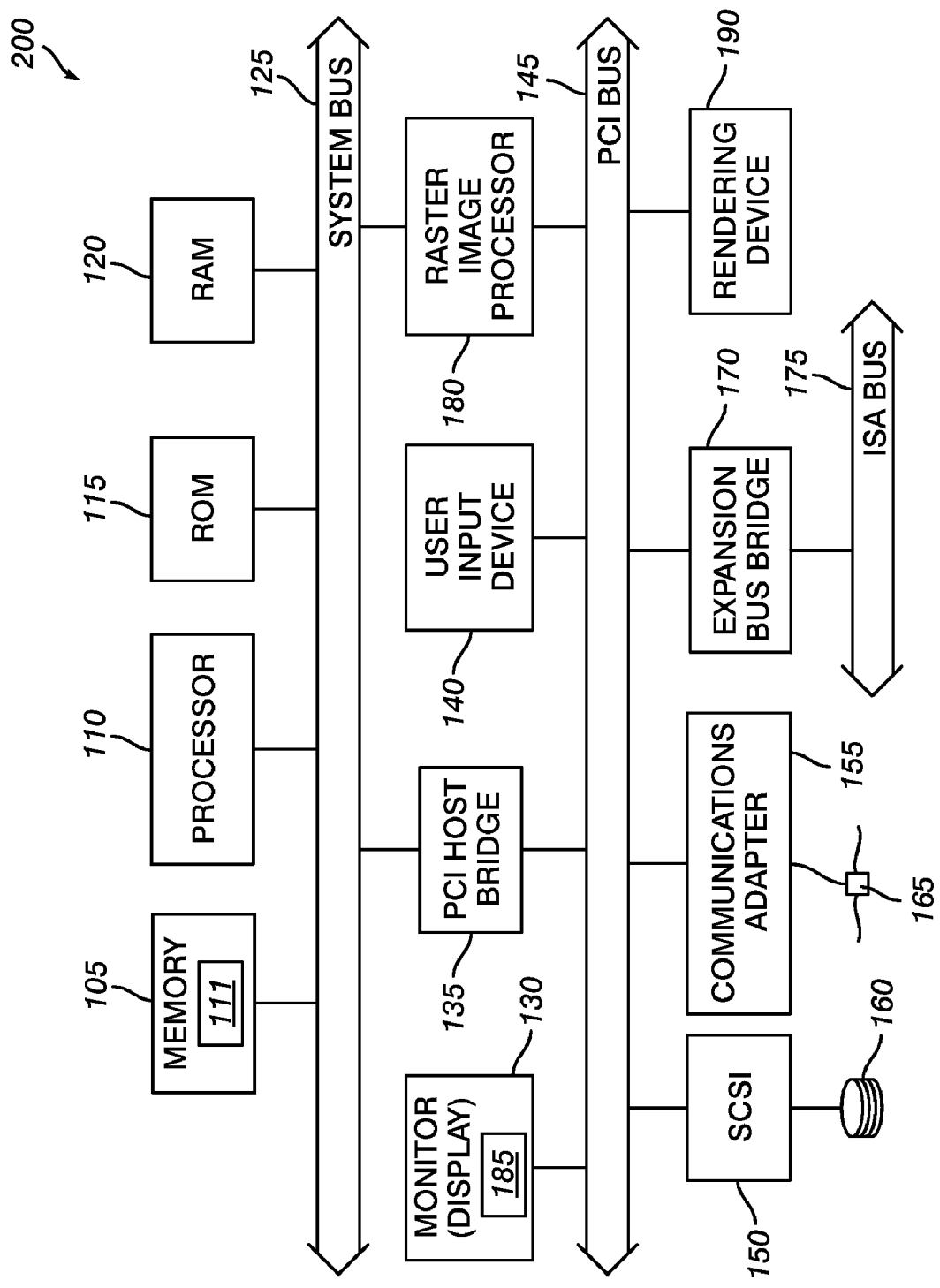
FIG. 2 illustrates a block diagram of a data-processing apparatus, which can be utilized for automatically identifying repeat print jobs utilizing object level hash tables, in accordance with a preferred embodiment.

Referring to the drawings and in particular to FIG. 2, there is depicted a data-processing apparatus 200 which can be utilized for automatically identifying repeat print jobs utilizing object level hash tables. Data-processing apparatus 200 represents one of many possible data-processing and/or computing devices, which can be utilized in accordance with the disclosed embodiments. It can be appreciated that data-processing apparatus 200 and its components are presented for generally illustrative purposes only and do not constitute limiting features of the disclosed embodiments.

As depicted in FIG. 2, a memory 105, a processor (CPU) 110, a Read-Only memory (ROM) 115, and a Random-Access Memory (RAM) 120 are generally connected to a system bus 125 of data-processing apparatus 200. Memory 105 can be implemented as a ROM, RAM, a combination thereof, or simply a general memory unit. Module 111 can be stored within memory 105 and then retrieved and processed via processor 110 to perform a particular task. A user input device 140, such as a keyboard, mouse, or another pointing device, can be connected to PCI (Peripheral Component Interconnect) bus 145.

Data-process apparatus 200 thus includes CPU 110, ROM 115, RAM 120, and a rendering device 190 (e.g., printer, copier, scanner, etc.), which are also coupled to a PCI (Peripheral Component Interconnect) local bus 145 of data-processing apparatus 200 through PCI host-bridge 135. The PCI Host Bridge 135 can provide a low latency path through which processor 110 may directly access PCI devices mapped anywhere within bus memory and/or input/output (I/O) address spaces. PCI Host Bridge 135 also can provide a high bandwidth path for allowing PCI devices to directly access RAM 120.

A communications adapter 155, a small computer system interface (SCSI) 150, a raster image processor (RIP) 180, and an expansion bus-bridge 170 are also attached to PCI local bus 145. The communications adapter 155 can be utilized for connecting data-processing apparatus 200 to a network 165. SCSI 150 can be utilized to control high-speed SCSI disk drive 160. An expansion bus-bridge 170, such as a PCI-to-ISA bus bridge, may be utilized for coupling ISA bus 175 to PCI local bus 145. Note that PCI local bus 145 can further be connected to a monitor 130, which functions as a display (e.g., a video monitor) for displaying data and information for a user and also for interactively displaying a graphical user interface (GUI) 185.

Note that the term "GUI" generally refers to a type of environment that represents programs, files, options and so forth by means of graphically displayed icons, menus, and dialog boxes on a computer monitor screen. A user can interact with the GUI 185 to select and activate such options by pointing and clicking with a user input device such as, for example, a pointing device such as a mouse, and/or with a keyboard. A particular item can function in the same manner to the user in all applications because the GUI 185 provides standard software routines (e.g., module 111) to handle these elements and reports the users actions. In this regard, a user actuates the appropriate keys on the user interface 185 to adjust the parameters of a print job. A user can access and operate the rendering device 190 using the user interface 185. The repeat print job identification system can be a software module such as, for example, the module 111 of apparatus 200 depicted in FIG. 2.

Figure 3:
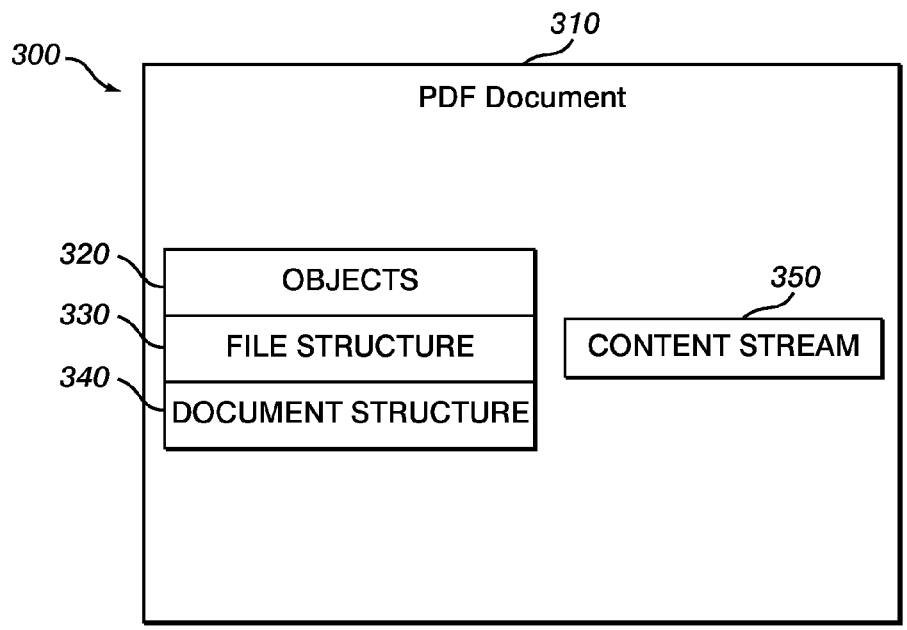
FIG. 3 illustrates a conceptual representation of a pdf document comprising different components, in accordance with a preferred embodiment.

Referring to FIG. 3 a conceptual representation 300 of a pdf document 310 comprising different components are illustrated, in accordance with a preferred embodiment. The print jobs can be submitted as a PDF (Portable Document Format) document 310. The print jobs can include, but are not limited to, alternate document formats that allow individual access to the various components of the document. The use of the PDF format as disclosed herein is for illustrative purposes only and is not considered a limiting feature of the embodiments. The PDF document 310, for example, can include different components such as objects 320, file structure 330, document structure 340 and content stream 350. PDF document 310 generally supports eight basic types of objects 320 such as Boolean values, integers and real numbers, strings, names, arrays, dictionaries, streams, the null object, and the like.

The objects 320 can essentially include the content of the PDF document 310. The PDF document 310 can be synthesized utilizing the objects 320 and additional syntactical information comprising the file structure 330. The content stream 350 includes common classes of interest such as images, graphics and text and can be extracted by suitable code. The color critical PDF content for e.g. image objects, graphics object, pantone colors etc can be extracted from the content stream 350 as objects. Note that it is sufficient if the binary stream corresponding to individual objects can be obtained.

Figure 4:
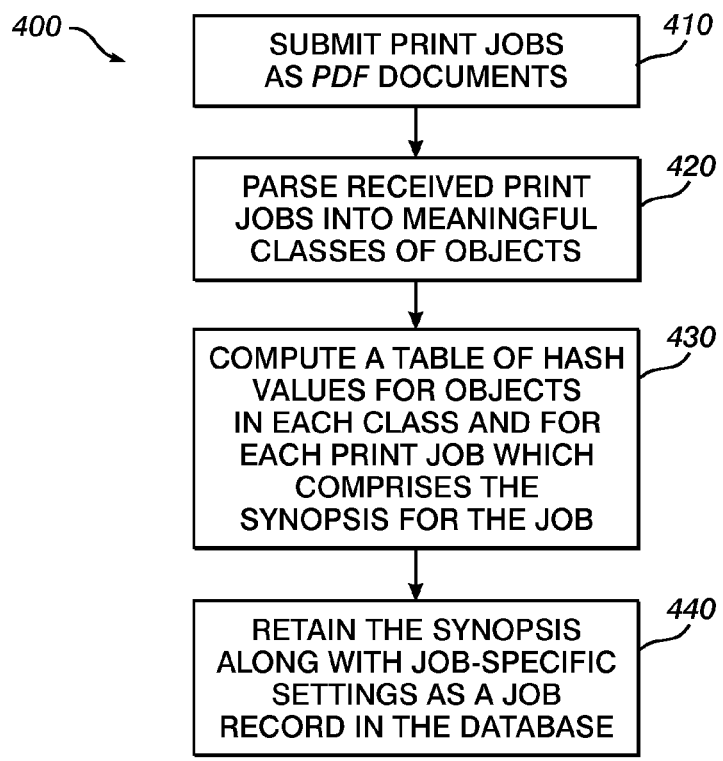
FIG. 4 illustrates a high level flow chart of operations illustrating logical operational steps of a method of object level hashing for repeat print jobs, in accordance with a preferred embodiment.

Referring to FIG. 4 illustrates a high level flow chart of operations illustrating logical operational steps of a method 400 of object level hashing for repeat print jobs, in accordance with a preferred embodiment. Note that the process or method 400 described in FIG. 4 can be implemented in the context of a software module, such as module 111 of apparatus 200 depicted in FIG. 2. As indicated at block 410, print jobs can be submitted as PDF documents 310.

Next, as depicted at block 420, the received print job can be parsed into meaningful classes of objects. Thereafter, as illustrated at block 430, a table of hash values for objects in each class and for each print job, which comprises the synopsis for the job, can be computed. The synopsis along with job-specific settings can be retained as a job record in a database, as described at block 440. The synopsis of the received print job along with the job-specific settings can be stored in memory such as a memory 105 of apparatus 200 depicted in FIG. 2.

Figure 5:
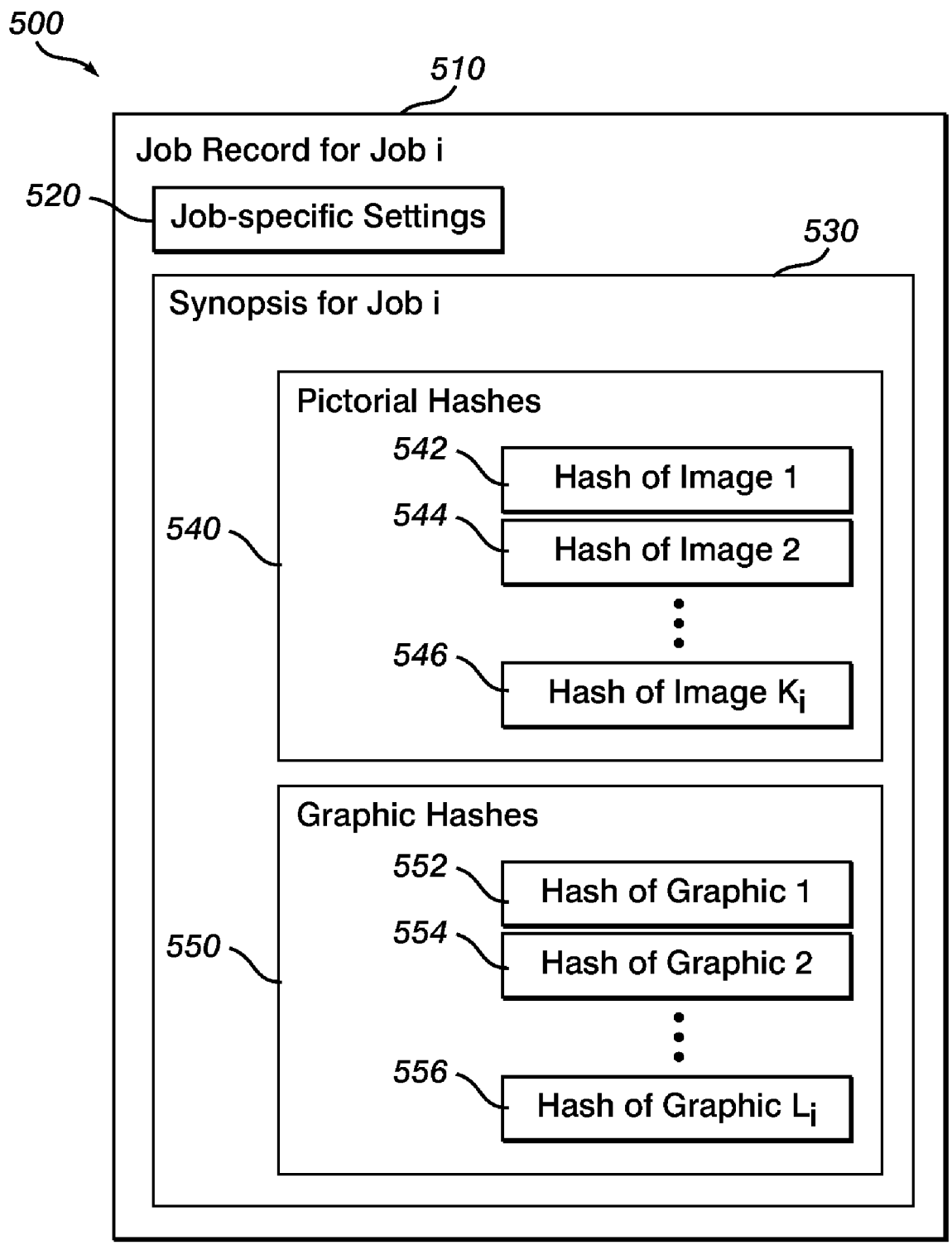
FIG. 5 illustrates a block diagram of a database record for a single print job, in accordance with an exemplary embodiment.

Referring to FIG. 5 a block diagram of a database record 500 for a single job is illustrated, in accordance with an exemplary embodiment. The database record 510 for the i-th job is shown in FIG. 5 where $K_i$ denotes the number of images in the i-th job and corresponding pictorial hashes 540, and $L_i$ represents the number of graphics objects of graphic hashes 550. The synopsis for the i-th job 530 can be created by individually hashing color critical objects in the job and maintaining the collection of hashes such as pictorial hashes 540 and graphic hashes 550 for each of the classes. In the illustration depicted in FIG. 5, pictorial hashes 540 generally include hashes 542, 544, 546, etc., and graphic hashes 550 generally include hashes 552, 554, 556, etc.

Note that the database record 500 suggested here is described for purposes of clarity and specificity, and should not be interpreted in a limiting manner. That is, the database record 500 constitutes merely an illustrative example. It can be appreciated that other comprehensive job database including additional information within each record for other purposes are also possible. Similarly, any hash functions either from those currently known or one that is subsequently invented may be utilized for generating the synopsis. This includes, for example, classical database or cryptographic hashes or perceptual hashes. One example of a hash approach that can be adapted for use in accordance with an alternative embodiment is disclosed in U.S. Pat. No. 6,671,407, entitled "System and Method for Hashing Digital Images," which is incorporated herein by reference in its entirety.

The database record for the i-th job 510 can thus be created by concatenating the synopsis 530 with the job-specific settings 520 which allows a consistent representation of repeat jobs. Examples of these include the state of the color reproduction device color configuration settings within a color digital front end (e.g., the Xerox DocuSP) and font-substitution preferences.

Figure 6:
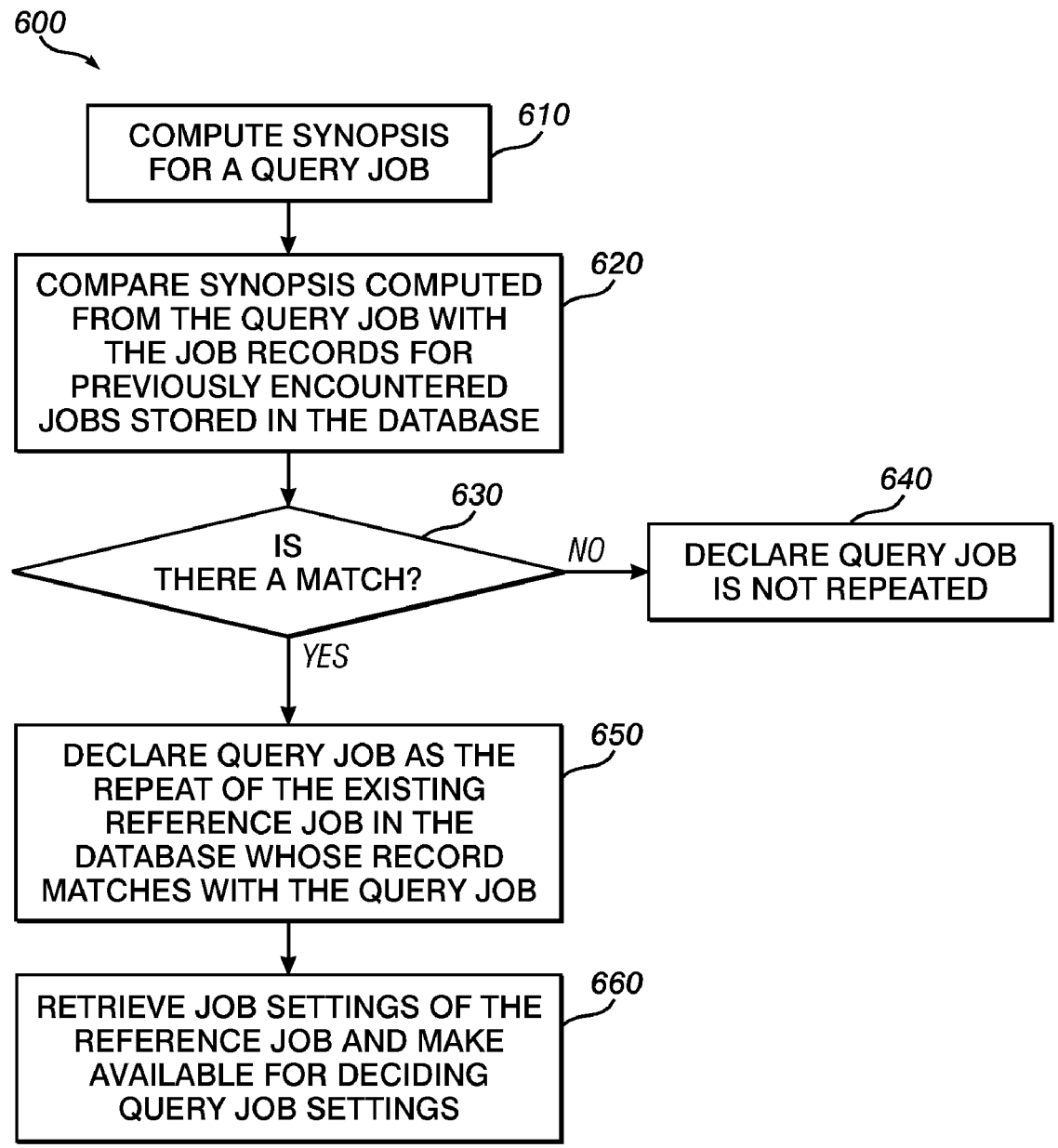
FIG. 6 illustrates another high level flow chart of operations illustrating logical operational steps of a method for automatically identifying repeat print jobs using object level hash tables, in accordance with an alternative embodiment.

Referring to FIG. 6 another high level flow chart of operations illustrating logical operational steps of a method 600 for automatically identifying repeat print jobs using object level hash tables is illustrated, in accordance with an alternative embodiment. Note that the process or method 600 described in FIG. 6 can be implemented in the context of a software module, such as module 111 of apparatus 200 depicted in FIG. 2. The synopsis for a query job can be computed utilizing process or method 400 as depicted at block 610. As described next at block 620, the synopsis computed from the query job can be compared with the job records of previously encountered jobs stored in the database.

The hashes comprising the synopsis computed from individual objects of the query job can be compared with the hashes of existing job stored in the database in order to determine whether identical objects are encountered in the previously encountered jobs. For example, the hashes of the pictorial objects in the newly encountered job can be compared one by one against the hashes for the pictorial objects in previously encountered jobs. Similarly, to determine if two inputs x and x' are same the hash values h(x) and h(x') can be computed and compared instead of comparing the inputs.

Next, as depicted at block 630, a determination can be made whether the query job match with the job records of previously encountered jobs stored in the database. If the query job does not match with the existing jobs stored in the database, the query job can be declared as not the repeat of the existing reference job, as depicted at block 640. Otherwise, query job can be declared as the repeat of the existing reference job in the database whose record matches with the query job, as depicted at block 650. As described next at block 660, job settings of the reference job can be retrieved and made available for deciding query job settings.

Note if the new query job is exactly the same as one of the previously processed jobs, then its complete synopsis can be identical to that of an existing job in the job database. Similarly, if the query job bears no relation to any of the existing jobs, then with very high probability, none of the object hashes in the synopsis will match. More generally, measures can be developed to quantify the quality of the match. For example, assume that N different object classes are used in the scheme and let $O_k$ denote an object type for instance pictorials. Consider the comparison of the query job to one of the reference jobs in the job database. The object type $O_k$ can be defined as shown in equation (4)

$$r_k = \frac{\text{\# of hash values in query table that are found in the reference table}}{\text{total \# of hash entries for } O_k \text{ in the query table}} \quad (4)$$

where the query table and the reference table refer to the tables of hash values for the object type $O_k$ in the synopses for the query and the existing jobs, respectively. A match measure m, between the query and the existing jobs may then be computed using various application specific criteria. For example, in an application where pictorial content represents the main color critical content (example customized calendars), equation (5) can be chosen $$m = r_{k_0} \quad (5)$$

where $k_0$ denotes the pictorial object type class. Alternately an average of the similarity for the different classes can be computed, as shown in equation (6)

$$m = \frac{1}{N}\sum_i r_i \quad (6)$$

Then in practice, if m>T, where 0<=T<1 is a predetermined threshold, the two hash tables can be declared to be matched and the new query job can be treated as a repeat of the reference job. The multiple matches can be resolved by picking the reference job whose hash table yields the highest measure m. This method helps in identifying repeat jobs and once it is determined any of the previously developed techniques for reliable reproduction of re-print jobs can be used. Note also that the measures in equations 4-6 are provided only as an example and the invention is not limited to the particular description but rather covers using any meaningful measure that helps decide if two hash tables are similar.

Based on the foregoing it can be appreciated that a system can be provided, through the use of one or more software modules as described above, which results in automatically identifying repeat print jobs utilizing object level hash tables. The main advantage of this method is that since only synopses of jobs need to be archived with the job-specific settings the system offers very significant savings in memory over archiving entire jobs. Equally significantly, the computation required for the system is also significantly reduced since only short synopses are compared instead of entire objects. Both these advantages allow the system to readily scale to realistic systems where a large number of jobs may be encountered and provides consistency in rendering across repeat jobs.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method, comprising:
   receiving at least one print job and parsing said at least one print job into meaningful classes of objects;
   computing a synopsis which comprises a plurality of hash values for said at least one print job utilizing said meaningful classes of objects;
   computing a query synopsis for a particular query print job and comparing said query synopsis with said synopsis of said at least one print job retained in said database record; and
   automatically identifying said query print job to be a repeat print job of said at least one print job in said database based on a non-negative measure of similarity computed utilizing object level hash matches of said query print job and said at least one print job in said database.

2. The method of claim 1 further comprising:
   automatically identifying said query print job as a repeat print job of said at least one print job in said database if a preset number of hashes of said query print job matches said plurality of hash values associated with said at least one print job.

3. The method of claim 1 further comprising:
   automatically identifying said query print job as a repeat print job of said at least one print job in said database if said at least one print job in said database possesses a maximum number of hash matches with said query print job over a plurality of print jobs in said database.

4. The method of claim 1 wherein said at least one print job comprises a PDF document.

5. The method of claim 1 further comprising:
   generating a pointer along with said synopsis in said database record which retains the location of said at least one print job.

6. The method of claim 1 wherein said synopsis which comprises said plurality of hash values and the measure to match said plurality of hash values depends on a user requirements and said query print job requirements.

7. The method of claim 1 further comprising identifying said repeat print job utilizing a user interface or a module.

8. The method of claim 2 wherein said meaningful classes of objects comprises a content of said PDF document which includes a graphic object, a image object and a text object.

9. A method, comprising:
   receiving at least one print job and parsing said at least one print job into a meaningful classes of objects;
   computing a synopsis which comprises a plurality of hash values for said at least one print job utilizing said meaningful classes of objects; and
   thereafter retaining said synopsis along with at least one job-specific setting in a database record of a database in order to automatically identify repeat print jobs utilizing said plurality of hash values;
   computing a query synopsis for a particular query print job and comparing said query synopsis with said synopsis of said at least one print job retained in said database record; and
   automatically identifying said query print job to be a repeat print job of said at least one print job in said database based on a non-negative measure of similarity computed utilizing an object level hash matches of said query print job and said at least one print job in said database.

10. The method of claim 9 further comprising:
    automatically identifying said query print job as a repeat print job of said at least one print job in said database if said at least one print job in said database possesses a maximum number of hash matches with said query print job over a plurality of print jobs in said database.

11. A system comprising one or more processor readable storage devices having processor readable code embodied on said processor readable storage devices, said processor readable code for programming one or more processors to perform a method comprising:
    receiving at least one print job and parsing said at least one print job into a meaningful classes of objects;
    computing a synopsis which comprises a plurality of hash values for said at least one print job utilizing said meaningful classes of objects; and
    computing a query synopsis for a particular query print job and comparing said query synopsis with said synopsis of said at least one print job retained in said database record wherein said query print job is automatically identifiable as a repeat print job of said at least one print job in said database based on a non-negative measure of similarity computed utilizing object level hash matches of said query print job and said at least one print job in said database.

12. The system of claim 11 wherein said query print job is automatically identifiable as a repeat print job of said at least one print job in said database if a preset number of hashes of said query print job matches said plurality of hash values associated with said at least one print job.

13. The system of claim 11 wherein said query print job is automatically identifiable as a repeat print job of said at least one print job in said database if said at least one print job in said database possesses a maximum number of hash matches with said query print job over a plurality of print jobs in said database.

14. The method of claim 11 wherein said at least one print job comprises a PDF document.

* * * * *